(12) United States Patent
Yoon et al.

(10) Patent No.: US 7,976,980 B2
(45) Date of Patent: Jul. 12, 2011

(54) SECONDARY BATTERY MODULE, A BATTERY SYSTEM INCLUDING THE SECONDARY BATTERY MODULE AND METHOD OF MANUFACTURE OF THE BATTERY SYSTEM

(75) Inventors: Junill Yoon, Seoul (KR); Jong-yul Ro, Seoul (KR); John E. Namgoong, Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 972 days.

(21) Appl. No.: 11/337,210

(22) Filed: Jan. 20, 2006

(65) Prior Publication Data

US 2007/0281208 A1    Dec. 6, 2007

(30) Foreign Application Priority Data

Jan. 21, 2005 (KR) .................. 10-2005-0005621

(51) Int. Cl.
*H01M 2/00* (2006.01)
*H01M 2/04* (2006.01)
(52) U.S. Cl. ........ 429/163; 429/176; 429/178; 29/623.1
(58) Field of Classification Search .................. None
See application file for complete search history.

(56) References Cited

U.S. PATENT DOCUMENTS

| | | | | |
|---|---|---|---|---|
| 3,841,915 A | * | 10/1974 | Eberle | 429/160 |
| 4,587,183 A | * | 5/1986 | McCartney, Jr. | 429/176 |
| 6,051,038 A | * | 4/2000 | Howard et al. | 29/623.1 |
| 2002/0015880 A1 | * | 2/2002 | Heimer | 429/97 |
| 2005/0100783 A1 | * | 5/2005 | Ro et al. | 429/159 |

FOREIGN PATENT DOCUMENTS

| | | |
|---|---|---|
| JP | 2001256934 | 9/2001 |
| JP | 2003142052 | 5/2003 |
| JP | 2004179141 | 6/2004 |

* cited by examiner

*Primary Examiner* — Dah-Wei D Yuan
*Assistant Examiner* — Kwang Han
(74) *Attorney, Agent, or Firm* — Cantor Colburn LLP

(57) ABSTRACT

Disclosed herein is a secondary battery module constructed approximately in a rectangular parallelepiped structure. The battery module includes a pair of side members (right and left side members) having pluralities of grooves formed at the inside surfaces thereof such that the sides of unit cells are securely fitted in the grooves and at least one connection member integrally formed with the side members such that the side members are spaced apart from each other by the width of the unit cells while the grooves of the side members face each other. A medium- or large-sized battery system is manufactured using one or more secondary battery module. The secondary battery module allows a plurality of unit cells to be mounted in the battery module with high density. Consequently, the total size of the battery system can be considerably reduced, and the electrical connection between the electrodes is highly stable. Furthermore, a risk of an engineer or a user being exposed to the electrical short-circuits is minimized, and a risk of electrical short-circuits due to external forces is greatly reduced.

8 Claims, 4 Drawing Sheets

SECONDARY BATTERY MODULE, A BATTERY SYSTEM INCLUDING THE SECONDARY BATTERY MODULE AND METHOD OF MANUFACTURE OF THE BATTERY SYSTEM

FIELD OF THE INVENTION

The present invention relates to a secondary battery module, which has a plurality of unit cells, such as lithium-ion polymer secondary cells, mounted therein, and which is used to constitute a medium- or large-sized battery system, and to a method of manufacturing a battery system using the same, and, more particularly, to a secondary battery module having high density to minimize the volume of the battery system, having high stability to accomplish the coupling between electrodes, and minimizing a risk of a user being exposed to electrical short-circuits.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Generally, small-sized mobile devices use one or several cells for each device. On the other hand, medium- or large-sized devices, such as vehicles, use a medium- or large-sized battery system having a plurality of cells electrically connected with each other because high output and large capacity is necessary for the medium- or large-sized devices.

Pouch-shaped lithium-ion polymer secondary cells, which are usually used as unit cells of a medium- or large-sized battery system, have low mechanical strength. For this reason, a plurality of unit cells are mounted in a cartridge such that the unit cells are electrically connected in series or in parallel with each other, and a plurality of cartridges are electrically connected with each other to manufacture a medium- or large-sized battery system.

However, the cartridges are formed approximately in the shape of a plate, and therefore, the cartridges occupy a large amount of area. In addition, the distance between the cartridges is large to effectively dissipate heat generated from the unit cells, and therefore, the total volume of the battery system is increased.

Also, the protruding areas of a cathode and an anode of each unit cell are large, and therefore, an engineer who manufactures the battery system or a user may be exposed to a high risk of electrical short-circuits.

Furthermore, the electrical connection (in series or in parallel) between the electrodes is poor, and therefore, short-circuits may occur due to external forces, such as vibrations and impacts.

SUMMARY OF THE INVENTION

Accordingly, it is an object of the present invention to substantially obviate the above-mentioned problems of the conventional arts as well as the technical problems requested from the past.

The inventors have performed various experiments and research, and finally have developed a secondary battery module for medium- or large-sized battery systems, which is capable of allowing a plurality of unit cells to be mounted in the battery module with high density, thereby considerably reducing the total size of the battery system, allowing electrodes to be electrically connected with each other with high stability, and minimizing a risk of an engineer or a user being exposed to the electrical short-circuits when the engineer manufactures the battery system or the user uses the battery system.

In accordance with one aspect of the present invention, the above and other objects can be accomplished by the provision of a secondary battery module constructed approximately in a rectangular parallelepiped structure, comprising: a pair of side members (right and left side members) having pluralities of grooves formed at the inside surfaces thereof such that the sides of unit cells are securely fitted in the grooves; and at least one connection member integrally formed with the side members such that the side members are spaced apart from each other by the width of the unit cells while the grooves of the side members face each other.

Consequently, the unit cells are sequentially inserted between the right and left side members such that the opposite sides of the unit cells are fitted in the facing grooves of the right and left side members.

The width of the grooves corresponds to the thickness of each unit cell. However, the length of the grooves is not particularly restricted so long as the unit cells can be stably mounted between the right and left side members. In the battery module according to the present invention, the opposite sides of the unit cells are fixed at the side members, and the other regions of the unit cells are exposed. Consequently, the heat dissipation effect is very high, and therefore, desired heat dissipation is accomplished even though the distance between the unit cells is small, by which a high-density battery system can be manufactured.

Preferably, the connection member is integrally formed at one or more of the upper ends, the lower ends, the front ends, and the rear ends of the right and left side members. In the case that the connection members are provided in large numbers, at least one of the front ends and the rear ends of the right and left side members must be opened such that the unit cells can be inserted between the right and left side members through the front ends or the rear ends of the right and left side members.

In a preferred embodiment of the present invention, the right and left side members are provided at the upper ends thereof with coupling protrusions, and the right and left side members are provided at the lower ends thereof with coupling grooves, which correspond to the coupling protrusions. Consequently, two or more battery modules can be easily coupled with each other. In the above-described structure, a plurality of battery modules can be coupled with each other in high density without using additional coupling members.

In another preferred embodiment of the present invention, the connection member is formed at the upper ends or the lower ends of the right and left side members and at the front ends or the rear ends of the right and left side members, and the battery module further comprises: an additional covering member for covering the opened rear ends or the opened front ends of the right and left side members while the unit cells are mounted between the right and left side members.

Preferably, the covering member includes a plurality of electrically insulating partitions, which can be inserted between electrode connection parts of the unit cells. The electrode connection parts are regions where the electrodes of one unit cell are electrically connected to those of another unit cell, which is located adjacent to the one unit cell. The electrical connection is a series connection or a parallel connection. Preferably, the electrical connection is the series connection.

After the assembly of the battery module is completed, the electrode connection parts are electrically isolated from each other by the partitions. Consequently, a risk of an engineer or a user being exposed to electrical short-circuits is minimized, and a risk of electrical short-circuits due to external forces during the use of the battery module is greatly reduced.

The material for the secondary battery module according to the present invention is not particularly restricted. Preferably, an electrically insulating material, such as polypropylene, polybutadiene, polystyrene, or acrylonitrile-butadiene-styrene (ABS) resin, is used for the material for the secondary battery module.

The unit cells mounted in the battery module according to the present invention are not particularly restricted. Preferably, the unit cells are pouch-shaped lithium-ion polymer secondary cells.

In accordance with another aspect of the present invention, there is provided a method of manufacturing a medium- or large-sized battery system using the secondary battery module as described above. Specifically, the battery system manufacturing method comprises the steps of: (i) inserting the opposite sides of one unit cell into the first lowermost ones of grooves formed at right and left side members of the battery module, such that the grooves face each other, to fix the one unit cell, and inserting the opposite sides of another unit cell into the second lowermost grooves of right and left side members of the battery module to fix the another unit cell, thereby stacking a plurality of unit cells in a space defined between the right and left side members; (ii) connecting electrode leads of the unit cells either in series with each other or in series with each other after the electrode leads of the unit cells are connected in parallel with each other; and (iii) electrically connecting one or more battery modules having the unit cells, electrically connected with each other, mounted therein to form a cathode terminal and an anode terminal.

Preferably, step (i) includes: applying or partially filling a bonding agent or resin, such as silicon, into the grooves such that the unit cells can be more stably fixed in the grooves.

Preferably, step (ii) includes: locating an insulating auxiliary member having slits, through which electrode leads of the unit cells are inserted, on the unit cells; and electrically connecting the electrode leads of the unit cells exposed above the auxiliary member, whereby the connection between the electrodes is more securely and easily accomplished. Preferably, the electrical connection between the electrodes is accomplished by positioning conductive bus bars on the electrode leads to be connected with each other and performing laser welding. Generally, the electrode leads are connected with each other by the laser welding, and therefore, the electrode leads have high reliability and stability. However, the unit cells may be damaged when cell bodies of the unit cells are exposed to a laser beam. According to the present invention, the above-mentioned problem is eliminated by the provision of the insulating auxiliary members as described above.

In step (iii), only one battery module having a plurality of unit cells mounted therein may be used to manufacture a medium- or large-sized battery system. Alternatively, two or more battery modules may be used to manufacture the medium- or large-sized battery system. When two or more battery modules are used to manufacture the medium- or large-sized battery system, it is preferable that the right and left side members be provided at the upper ends thereof with coupling protrusions, and the right and left side members be provided at the lower ends thereof with coupling grooves, which correspond to the coupling protrusions, as described above.

According to circumstances, the battery system manufacturing method further comprises the step of: mounting the above-described covering member at the electrode connection parts after step (ii) or step (iii), whereby a risk of the engineer or the user being exposed to the electrical short-circuits is minimized, and the electrical short-circuits between the electrode connection parts during the manufacture or use of the battery module is greatly reduced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
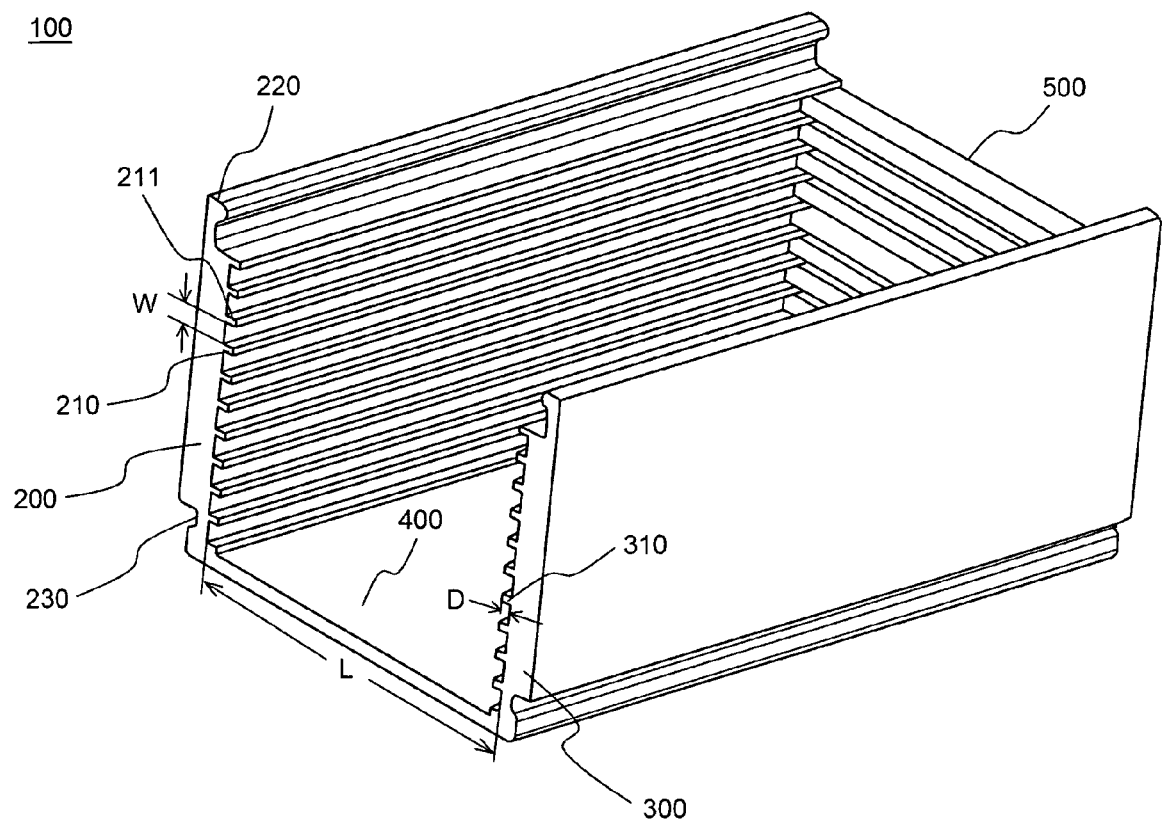
FIG. 1 is a typical perspective view illustrating a secondary battery module according a preferred embodiment of the present invention.

FIG. 1 is a typical perspective view illustrating a secondary battery module 100 according a preferred embodiment of the present invention.

Referring to FIG. 1, the battery module 100 is constructed approximately in a rectangular parallelepiped structure having an opened top part and an opened front part.

At a left-side member 200 and a right-side member 300 are formed grooves 210 and 310, respectively, which are arranged on the inside surfaces of the side members 200 and 300 such that the grooves 210 and 310 face each other. The distance between the side members 200 and 300 (more specifically, the distance between the grooves 210 of the left-side member 200 and the grooves 310 of the right-side member 300) is equal to or slightly greater than the width of each unit cell (not shown) inserted between the left-side member 200 and the right-side member 300. Also, the grooves 210 and 310 of the side members 200 and 300 have a width W equal to or slightly greater than the thickness of each unit cell. The depth D of the grooves 210 and 310 is not particularly restricted so long as the unit cells can be stably fitted in the grooves 210 and 310.

The side members 200 and 300 are integrally formed with a connection member 400, which constitutes the bottom part of the battery module 100. At the rear of the battery module 100 is disposed another connection member 500, which is either coupled to the side members 200 and 300 and the connection member 400 or integrally formed with the side members 200 and 300 and the connection member 400.

The battery module 100 of FIG. 1 may be used either individually or in combination with at least another battery module 100. To accomplish the secure coupling between the two or more battery modules 100, coupling protrusions 220 are formed at the upper ends of the side members 200 and 300, and coupling grooves 230 are formed at the lower ends of the side members 200 and 300. The coupling grooves 230 correspond to the coupling protrusions 220.

Figure 2:
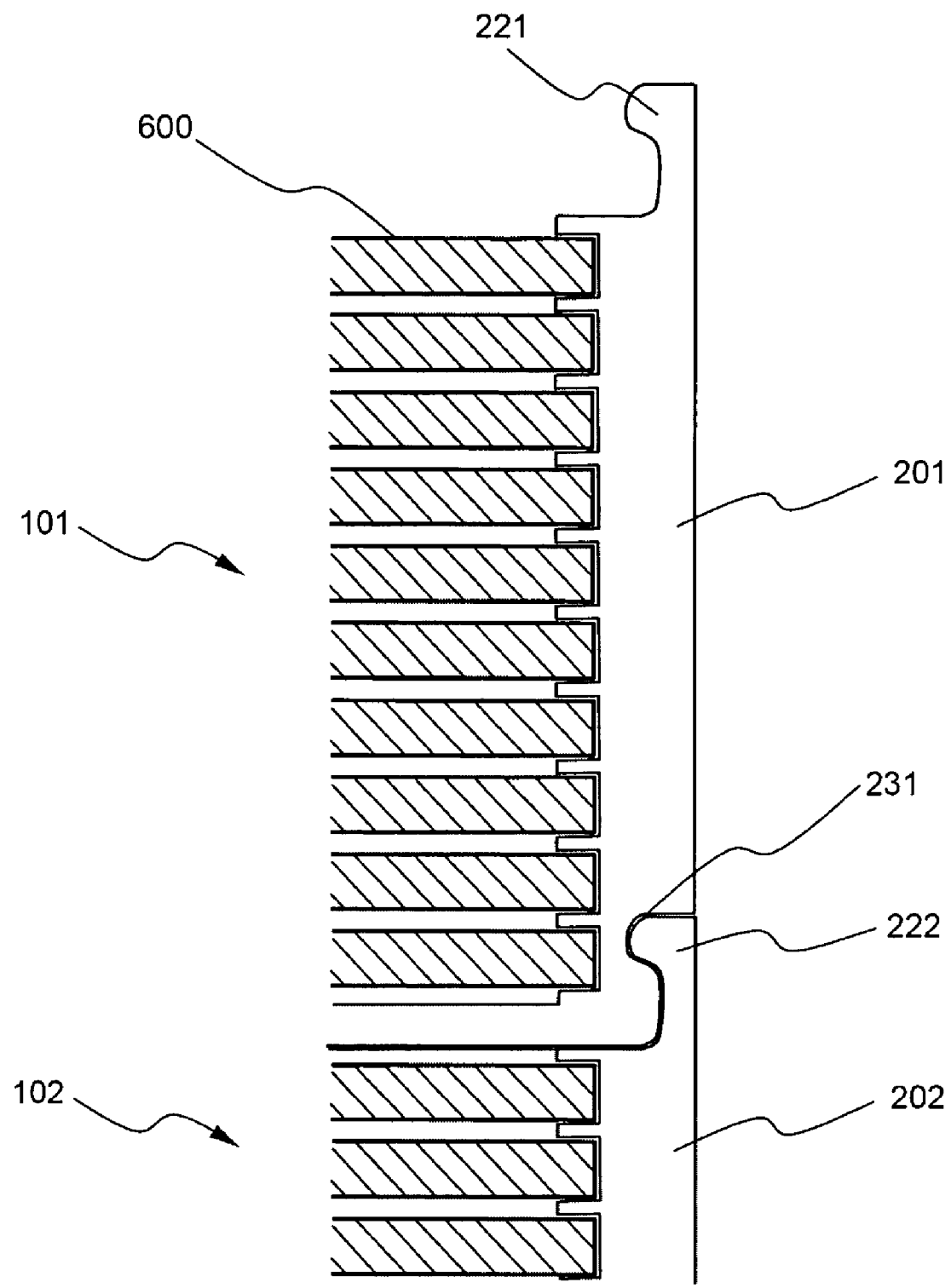
FIG. 2 is a partially enlarged view illustrating the coupling between two secondary battery modules, one of which is shown in FIG. 1.

FIG. 2 is a partially enlarged view illustrating the coupling between two secondary battery modules 101 and 102.

Referring to FIG. 2, one of the battery modules, i.e., the first battery module 101, which has a plurality of unit cells 600 mounted therein, is provided at the upper end of a side member 201 thereof with a hook-shaped coupling protrusion 221. At the lower end of the side member 201 is formed a coupling groove 231, which corresponds to the coupling protrusion 221. In the coupling groove 231 of the first battery module 101 is securely engaged a coupling protrusion 222 formed at a side member 202 of the other battery module, i.e., the second battery module 102.

Figure 3:
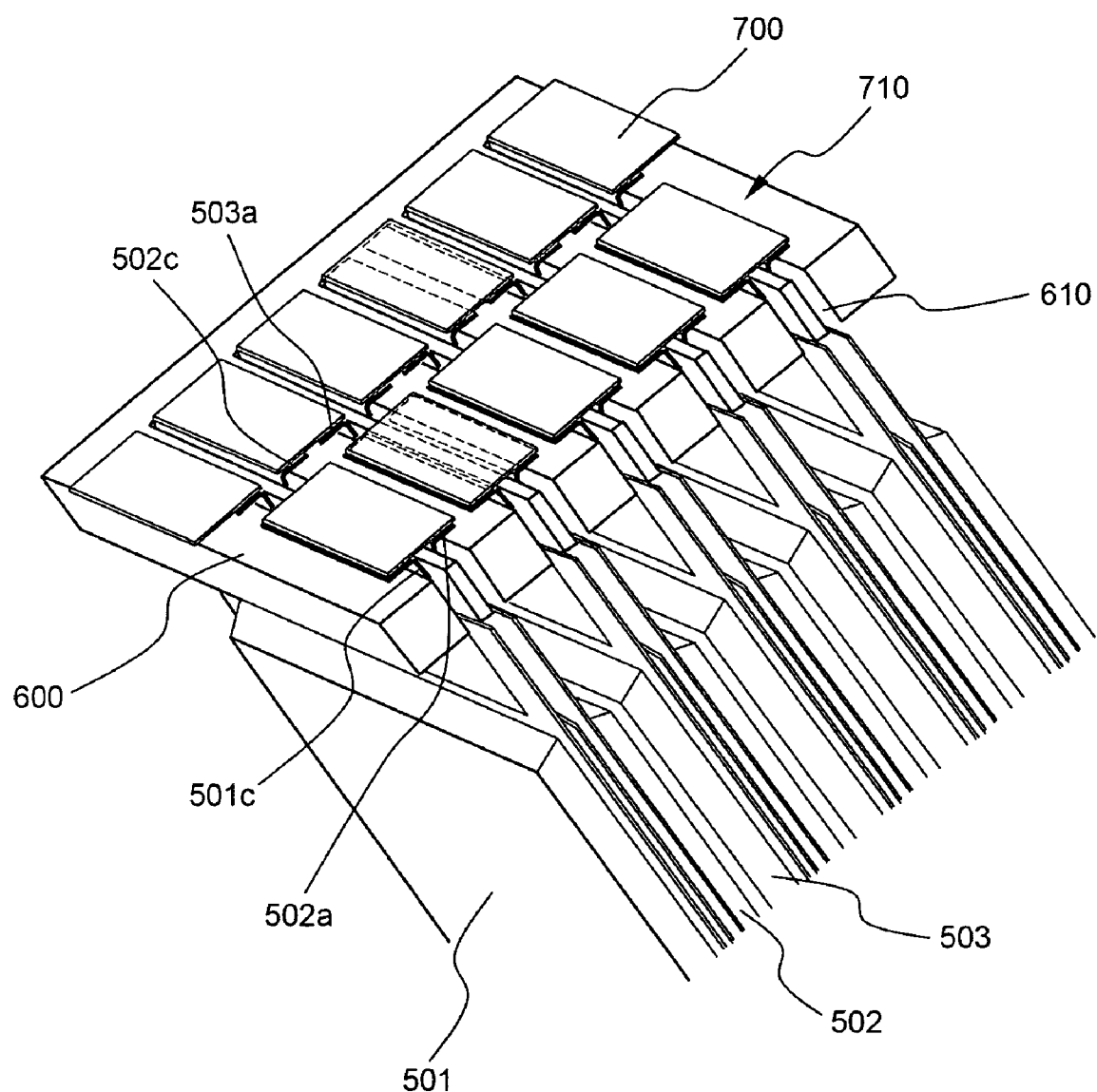
FIG. 3 is a typical perspective view illustrating the electrical connection between electrode leads of unit cells using an auxiliary member according to a preferred embodiment of the present invention.

FIG. 3 is a typical perspective view illustrating the electrical connection between unit cells 501, 502 . . . using an auxiliary member 600 while the unit cells 501, 502 . . . are mounted in the battery module according to the present invention. For easy description and understanding, the battery module is not shown in FIG. 3.

Referring to FIG. 3, electrode leads 501c, 502a, 502c, 503a . . . of the unit cells 501, 502 . . . protrude upward while the unit cells 501, 502 . . . are mounted in the battery module (not shown). The auxiliary member 600, which is an electrical insulating member, has a plurality of slits 610, through which the electrode leads 501c, 502a, 502c, 503a . . . of the unit cells 501, 502 . . . are inserted.

To accomplish the electrical connection between the unit cells 501, 502, the auxiliary member 600 is located on the unit cells 501, 502 . . . such that the electrode leads 501c, 502a, 502c, 503a . . . of the unit cells 501, 502 . . . can be exposed above the auxiliary member 600 through the slits 610 of the auxiliary member 600. Next, the electrode leads 501c, 502a, 502c, 503a . . . exposed above the auxiliary member 600 are bent, and then bus bars 700 are mounted on the bent electrode leads 501c, 502a, 502c, 503a . . . of the unit cells 501, 502 . . . . For example, to accomplish the connection in series between the first unit cell 501 and the second unit cell 502, the cathode lead 502c of the first unit cell 501 and the anode lead 502a of the second unit cell 502 are bent such that the bent cathode lead 502c of the first unit cell 501 is opposite to the bent anode lead 502a of the second unit cell 502, and then the bus bar 700 is mounted on the bent cathode lead 502c of the first unit cell 501 and the bent anode lead 502a of the second unit cell 502. Similarly, to accomplish the connection in series between the second unit cell 502 and the third unit cell 503, the cathode lead 502c of the second unit cell 502 and the anode lead 503a of the third unit cell 503 are bent such that the cathode lead 502c of the second unit cell 502 faces the anode lead 503a of the third unit cell 503, and then the bus bar 700 is mounted on the bent cathode lead 502c of the second unit cell 502 and the bent anode lead 503a of the third unit cell 503. The above-described process is performed for the other unit cells. Finally, the contact areas between the electrode leads 501c, 502a, 502c, 503a . . . of the unit cells 501, 502 . . . and the bus bars 700 are irradiated with a laser beam so as to weld the contact areas. Although the electrode leads 501c, 502a, 502c, 503a . . . of the unit cells 501, 502 . . . and the bus bars 700 are welded by the laser beam, the cell bodies of the unit cells are not badly affected by the provision of the insulating auxiliary member 600. Consequently, a highly reliable welding operation is accomplished using a more powerful laser beam. After the laser welding operation is completed, the auxiliary member 600 is removed. As a result, the unit cells 501, 502 . . . are connected to each other while the unit cells 501, 502 . . . include electrode connection parts 710.

Figure 4:
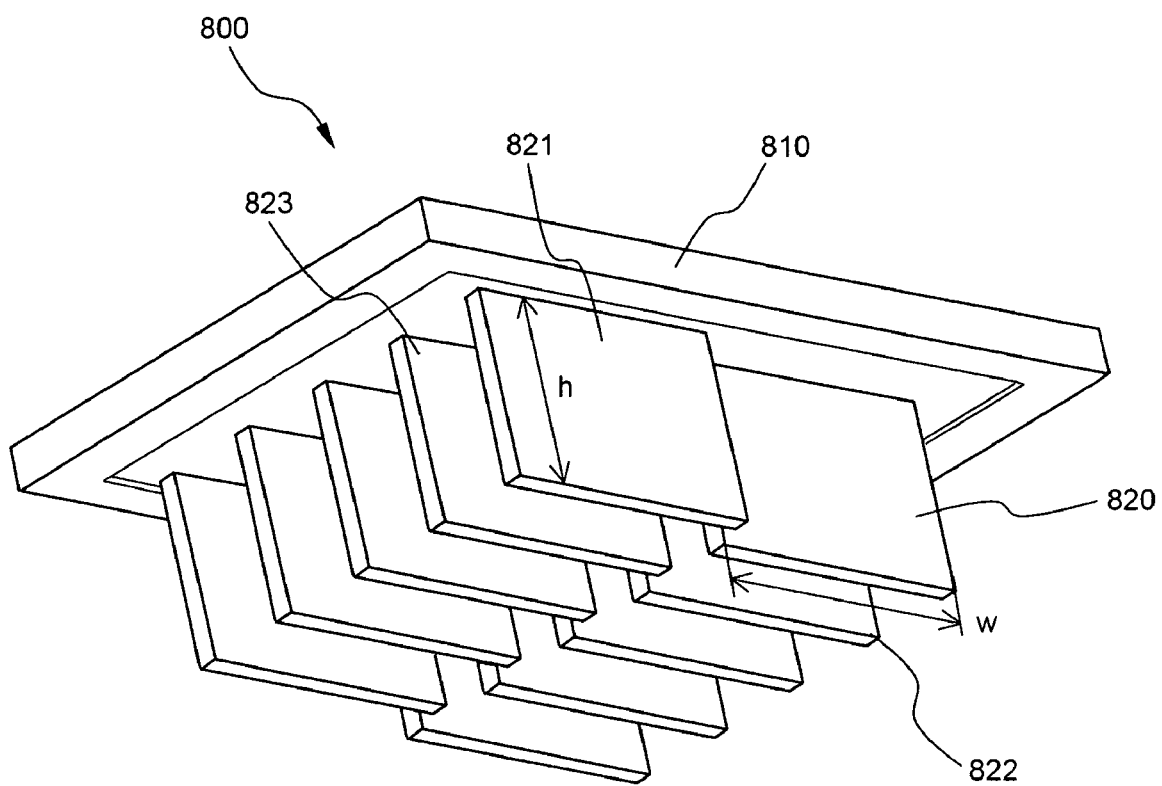
FIG. 4 is a typical perspective view illustrating a covering member according to a preferred embodiment of the present invention.

FIG. 4 is a typical perspective view illustrating a covering member 800 according to a preferred embodiment of the present invention, which can cover the opened region of the battery module, more specifically, the electrode connection parts 710, after the electrical connection between the unit cells is accomplished as shown in FIG. 3.

Referring to FIG. 4, the covering member 800 comprises a main body 810, which is mounted at the opened region of the battery module (not shown), and a plurality of partitions 820, 821, 822 . . . , which are formed at one surface of the main body 810.

The main body 810 has a size and a shape suitable to be mounted at the opened region of the battery module, at which the electrode connection parts 710 are disposed. The partitions 820, 821, 822 . . . are formed at the main body 810 such that the partitions 820, 821, 822 . . . can be inserted between the electrode connection parts 710 of FIG. 3. The height h and the width w of the partitions 820, 821, 822 . . . are not particularly restricted so long as the electrode connection parts 710 can be separated from each other by the partitions 820, 821, 822 . . . .

As shown in FIG. 3, the left-side electrode connection parts 710 and the right-side electrode connection parts 710 are alternately arranged. Consequently, as shown in FIG. 4, the right-side partitions 820, 822 . . . and the left-side partitions 821, 823 . . . are also alternately arranged such that the partitions 820, 821, 822 . . . correspond to the electrode connection parts 710.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery module for medium- or large-sized battery systems allows a plurality of unit cells to be mounted in the battery module with high density. Consequently, the present invention has the effect of considerably reducing the total size of the battery system. Also, the present invention has the effect of accomplishing the highly stable electrical connection between the electrodes. Furthermore, the present invention has the effect of minimizing a risk of an engineer or a user being exposed to the electrical short-circuits, when the engineer manufactures the battery system or the user uses the battery system, and greatly reducing a risk of electrical short-circuits due to external forces during the use of the battery system.

What is claimed is:

1. A secondary battery module constructed approximately in a rectangular parallelepiped structure, comprising:
    right and left side members, each side member having a plurality of grooves formed at inside surfaces thereof such that sides of unit cells are securely fitted in the grooves; and
    at least one connection member integrally formed with the side members such that the side members are spaced apart from each other by the width of the unit cells while the grooves of the side members face each other, wherein the connection member is formed at the upper ends or the lower ends of the right and left side members and at the front ends or the rear ends of the right and left side members; and a covering member for covering the opened rear ends or the opened front ends of the right and left side members while the unit cells are mounted between the right and left side members, the covering member including a plurality of protruding electrically insulating partitions, wherein each protruding electrically insulating partition can be inserted between electrode connection parts of the unit cells, in which the electrode connection parts are regions where the electrodes of one unit cell are electrically connected to those of another unit cell.

2. The battery module as set forth in claim 1, wherein the connection member is integrally formed at one or more of the upper ends, the lower ends, the front ends, and the rear ends of the right and left side members.

3. The battery module as set forth in claim 1, wherein
the right and left side members are provided at the upper ends thereof with coupling protrusions, and
the right and, left side members are provided at the lower ends thereof with coupling grooves, which correspond to the coupling protrusions.

4. The battery module as set forth in claim 1, wherein the electrode connection parts are connected in series with each other.

5. The battery module as set forth in claim 1, wherein the unit cells are pouch-shaped lithium-ion polymer secondary cells.

6. A method of manufacturing a medium- or large-sized battery system using a secondary battery module as set forth in claim 1, the method comprising the steps of:

(i) inserting opposite sides of one unit cell into first lowermost grooves of grooves formed at right and left side members of the battery module, such that the grooves face each other, to fix the one unit cell, and inserting opposite sides of another unit cell into second lowermost grooves of right and left side members of the battery module to fix the another unit cell, thereby stacking a plurality of unit cells in a space defined between the right and left side members;

(ii) locating an insulating auxiliary member having slits, through which electrode leads of the unit cells are inserted, on the unit cells, and electrically connecting electrode leads of the unit cells exposed above the auxiliary member either in series with each other or in series with each other after the electrode leads of the unit cells are connected in parallel with each other (iii) electrically connecting one or more battery modules having the unit cells, electrically connected with each other, mounted therein to form a cathode terminal and an anode terminal; and (iv) mounting a covering member at electrode connection parts.

7. The method as set forth in claim 6, wherein step (i) includes:
applying or partially filling a bonding agent or resin into the grooves before inserting the unit cells into the grooves.

8. The method as set forth in claim 1, wherein the electrical connection between the electrodes is accomplished by positioning conductive bus bars on the electrode leads to be connected with each other and performing laser welding.

* * * * *